(12) United States Patent
Mizutani et al.

(10) Patent No.: US 7,042,115 B2
(45) Date of Patent: May 9, 2006

(54) POWER SUPPLY CONTROL SYSTEM FOR VEHICLE AND METHOD

(75) Inventors: Koichi Mizutani, Toyota (JP); Shouji Abo, Toyota (JP); Kan Ohtsuka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 484 days.

(21) Appl. No.: 10/366,380

(22) Filed: Feb. 14, 2003

(65) Prior Publication Data

US 2003/0160510 A1 Aug. 28, 2003

(30) Foreign Application Priority Data

Feb. 26, 2002 (JP) .................. 2002-050450

(51) Int. Cl.
*B60L 3/00* (2006.01)
*H02J 7/00* (2006.01)
*B60L 1/00* (2006.01)

(52) U.S. Cl. ............... 307/10.1; 307/9.1; 307/10.6; 307/80; 320/103; 320/104

(58) Field of Classification Search ............ 307/80, 307/9.1, 10.6; 320/103, 104
See application file for complete search history.

(56) References Cited

U.S. PATENT DOCUMENTS

| | | | |
|---|---|---|---|
| 4,025,860 A * | 5/1977 | Shibata et al. | 320/126 |
| 6,452,361 B1 * | 9/2002 | Dougherty et al. | 320/104 |
| 6,682,849 B1 * | 1/2004 | Narang et al. | 429/218.1 |
| 6,815,118 B1 * | 11/2004 | Fleming et al. | 429/94 |

FOREIGN PATENT DOCUMENTS

| | | |
|---|---|---|
| DE | 41 38 943 C1 | 5/1993 |
| JP | 58 139838 A | 8/1983 |
| JP | 58 139839 A | 8/1983 |
| JP | 2001-313082 A | 11/2001 |
| JP | 2003/158830 | * 5/2003 |

OTHER PUBLICATIONS

European Patent Office Communication dated Jun. 25, 2003 with attached European search report.

* cited by examiner

*Primary Examiner*—Brian Sircus
*Assistant Examiner*—Hal Kaplan
(74) *Attorney, Agent, or Firm*—Kenyon & Kenyon LLP

(57) ABSTRACT

A power supply control system for a vehicle that is provided with a lead-acid battery with comparatively high output density and low energy density, and a lithium-ion battery with comparatively low output density and high energy density. On an engine start that accompanies an ignition operation of a vehicle operator, power is supplied to a starter from the lead-acid battery and the engine is started. On an engine restart that accompanies an idling stop control, power is supplied to the starter from the lithium-ion battery and the engine is started.

19 Claims, 2 Drawing Sheets

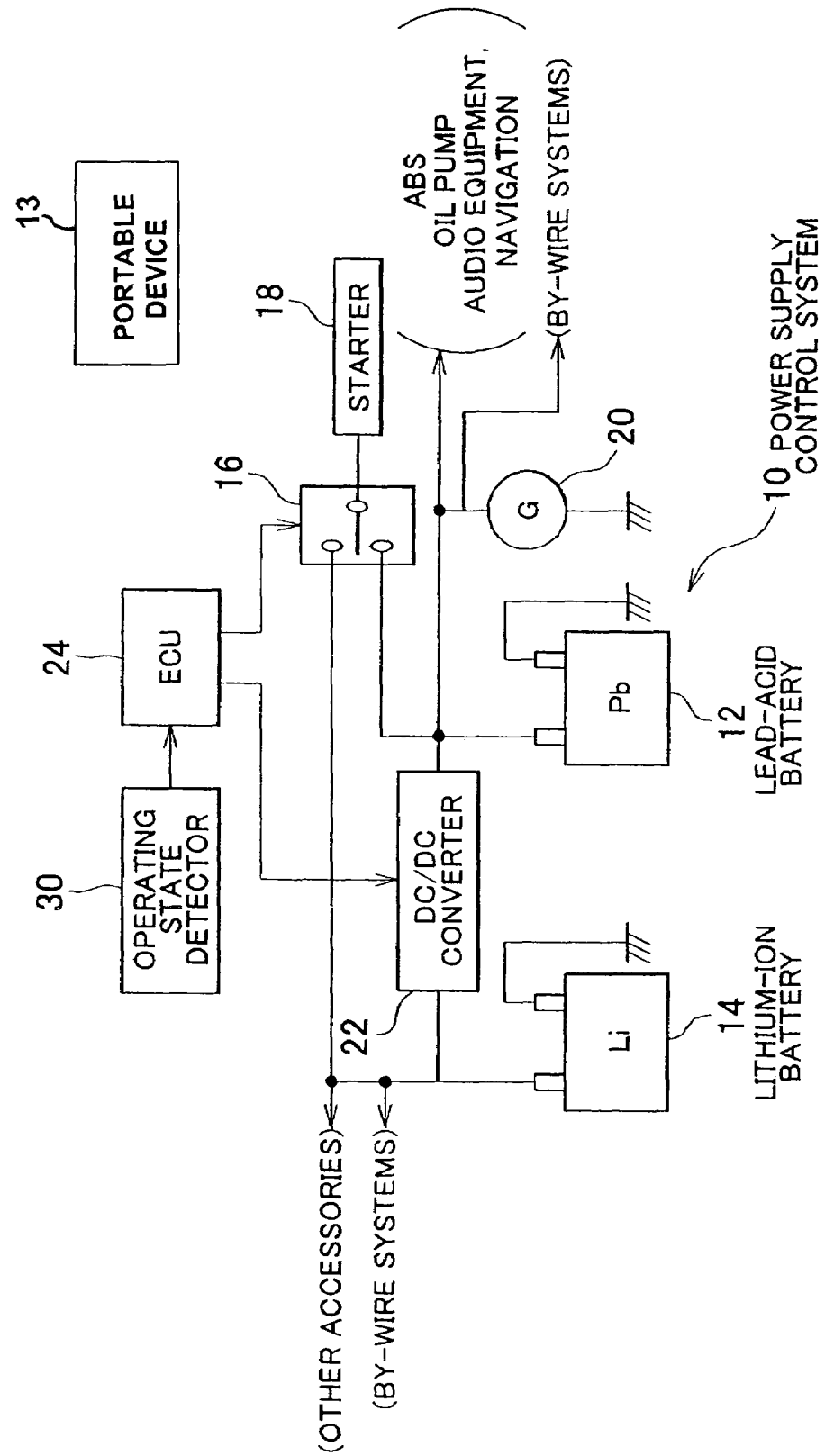

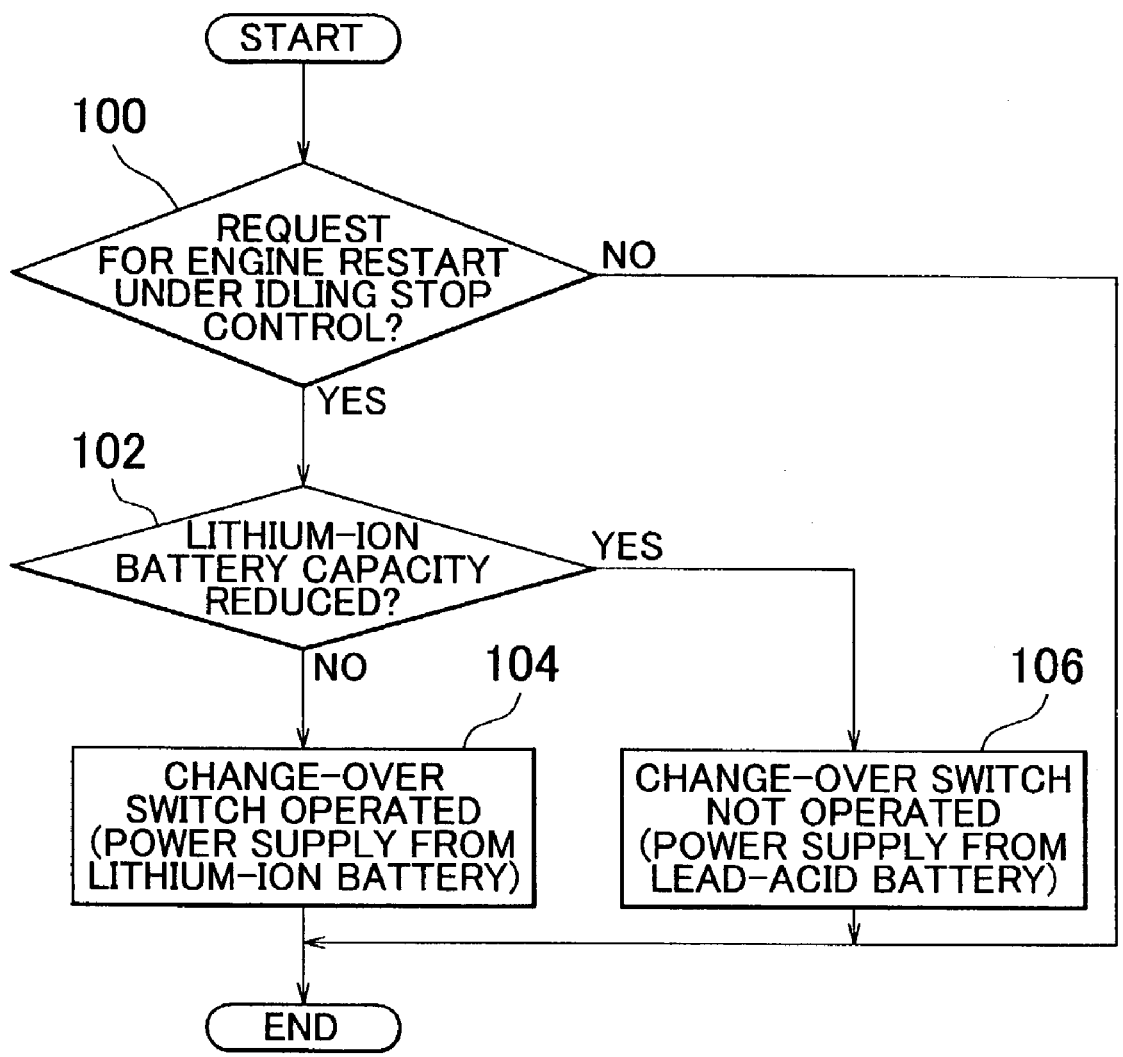

POWER SUPPLY CONTROL SYSTEM FOR VEHICLE AND METHOD

INCORPORATION BY REFERENCE

The disclosure of Japanese Patent Application No. 2002-50450 filed on Feb. 26, 2002 including the specification, drawings and abstract is incorporated herein by reference in its entirety.

BACKGROUND OF THE INVENTION

1. Field of Invention

The invention relates to a power supply control system for a vehicle. More specifically, the invention relates to a power supply control system for a vehicle, which executes an idling stop control that automatically carries out stop and start of an engine according to an operating state of the vehicle.

2. Description of Related Art

A power supply system for a vehicle provided with a lead-acid battery and a lithium-ion battery has been known. An example of this kind of system is disclosed in Japanese Patent Laid-Open Publication No. 2001-313082, for example. This power supply system regenerates energy produced on vehicle deceleration to the lead-acid battery as well as to the lithium-ion battery, which has a higher regenerative capacity. Therefore, energy efficiency for the on-vehicle power supply system as a whole can be improved. Furthermore, in the power supply system, power is supplied to the engine from the lead-acid battery on vehicle start.

A vehicle may be equipped with a system that carries out a control which stops an operation of an engine, for example, during a traffic light stop or the like, and restarts the operation of the engine when the vehicle pulls away (this control is hereafter referred to as the "idling stop control"). In the state where the vehicle in which the idling stop control is carried out mounts the aforementioned lead-acid battery and the lithium-ion battery, and, as in the system discussed above, if both an engine start that accompanies normal vehicle start-up and an engine start that accompanies the idling stop control are carried out constantly utilizing the lead-acid battery, deterioration of the lead-acid battery will be precipitated because the lead-acid battery is in a state where it is being continuously operated under a load. Therefore, in this configuration, the reliability of the engine start is reduced and in turn it becomes increasingly possible that an opportunity to execute the idling stop control will be denied.

SUMMARY OF THE INVENTION

It is an object of the invention to provide a power supply control device for a vehicle, which can reliably carry out both an engine start that accompanies vehicle start-up and an engine start that accompanies an idling stop control, without precipitating deterioration of a battery.

A power supply control system for a vehicle in which an idling stop control is performed such that an engine is automatically stopped and started in accordance with an operating state of the vehicle is provided. The power supply control system includes a first battery connected to a starter of the vehicle, a second battery connected to the starter of the vehicle, having an energy density higher than that of the first battery and having an output density lower than that of the first battery, and a controller operative to select the first battery to be connected to the starter so as to receive a power supply from the first battery under a first condition where the engine is started to cause the vehicle to take off, and to select the second battery to be connected to the starter so as to receive the power supply from the second battery under a second condition where the engine is started by the idling stop control.

Generally, on the engine start that accompanies a normal vehicle start-up (hereafter referred to as a "normal start"), a battery load is relatively large as cold start of the engine is required. On the other hand, on the engine start that accompanies the idling stop control (hereafter referred to as a "restart"), the battery load is relatively small as the engine has been already warmed. Therefore, in order to reliably ensure startability on the normal start, it is appropriate to utilize a battery with a higher output density than on the restart. The idling stop control is carried out at frequent intervals during vehicle running. Therefore, in order to reliably ensure the startability of the engine on the restart, it is appropriate to utilize a battery with a higher energy density than on the normal start.

In the invention, power is supplied to a starter from the first battery on the normal start. Furthermore, on the restart, power is supplied to the starter from the second battery that has a higher energy density and a lower output density than the first battery. Therefore, the reliability of the engine start can be ensured on both the normal start and the restart. Furthermore, on the normal start, where the load is comparatively larger, the startability of the engine can be reliably ensured because the comparatively low output density second battery does not supply power to the starter. Moreover, on the restart, which takes place comparatively frequently, because the comparatively low energy density first battery does not supply power to the starter, precipitation of the deterioration of the first battery may be avoided.

The second battery may be one of a lithium-ion battery and a nickel metal hydride battery.

The first battery may be a lead-acid battery.

The start of the engine under the first condition is established on the basis of an intention of a vehicle operator of causing the vehicle to take off.

The start of the engine under the first condition is established upon authentication of a wireless communication between a device mounted on the vehicle and a portable device 13 carried by the vehicle operator. As discussed above, both the engine start that accompanies the vehicle start-up and the engine start the accompanies the idling stop control can be reliably carried out without precipitating the deterioration of the battery.

If the power supply to the starter from the second or the first battery is not adequately carried out to ensure the startability of the engine due to a capacity reduction, a temperature change or the like, it is difficult to start the engine utilizing such battery.

The controller determines whether the power supply to the starter from the second battery is sufficient to start the engine. When it is determined that the power supply to the starter from the second battery to start the engine under the second condition is insufficient, the controller selects the first battery to be connected to the starter so as to receive the power supply from the first battery. Therefore, even if the engine cannot be restarted by the second battery, it can be restarted by the first battery. This makes it possible to avoid a state where the engine cannot be restarted due to inadequate power supply from the second battery to the starter.

The controller determines whether the power supply to the starter from the first battery is sufficient to start the engine. When it is determined that the power supply to the starter from the first battery to start the engine under the first condition is insufficient, the controller selects the second battery to be connected to the starter so as to receive the power supply from the second battery. Therefore, even if the engine cannot be normally started by the first battery, the engine can be normally started by the second battery. This makes it possible to avoid a state where the engine cannot be normally started due to inadequate power supply from the first battery to the starter.

BRIEF DESCRIPTION OF THE DRAWINGS

FIG. 1 is a configuration diagram of a power supply control system of a vehicle according to an exemplary embodiment of the invention; and FIG. 2 is a flow chart of a control routine that is executed to carry out an engine restart that accompanies an idling stop control.

DETAILED DESCRIPTION OF PREFERRED EMBODIMENTS

FIG. 1 is a configuration diagram of a power supply control system 10 of a vehicle according to an exemplary embodiment of the invention. As FIG. 1 shows, the power supply control system 10 is provided with two batteries 12 and 14. The battery 12 is a lead-acid battery with a voltage of approximately 12 V, and the battery 14 is a lithium-ion battery with a voltage of approximately 14.4 V. Hereafter, the battery 12 will be referred to as the lead-acid battery 12 and the battery 14 will be referred to as the lithium ion battery 14. The lead-acid battery 12 has a higher output per unit volume (output density unit: W/l) but a low energy per unit volume (energy density unit: Wh/l) compared with the lithium-ion battery 12. In other words, the lithium-ion battery 14 has a lower output density and a higher energy density than the lead-acid battery 12.

A starter 18 is connected to both the lead-acid battery 12 and the lithium-ion battery 14 through a change-over switch 16. The starter 18 is connected to an engine (not shown) that functions as a power source for a vehicle. The starter 18 utilizes power supplied from the lead-acid battery 12 or the lithium-ion battery 14, connected through the change-over switch 16, and functions in starting the engine that has been in a stopped state.

The engine is provided with a direct current generator 20 that generates electric power using the rotation of the engine. The lead-acid battery 12 is connected to the direct current generator 20. The direct current generator 20 supplies power to the lead-acid battery 12 by converting kinetic energy of the vehicle when regenerative braking takes place to electrical energy, and is able to charge the lead-acid battery 12. The direct current generator 20 may increase regenerative efficiency by being connected to the lithium-ion battery 14 side. In this case, charging from the direct current generator 20 to the battery 12 takes place through a DC/DC converter 22, which will be discussed hereafter.

A plurality of accessories such as an air conditioner, audio equipment and the like that receive a supply of power for operation, as well as so-called by-wire systems, such as an accelerator, a brake and the like, are connected to the direct current generator 20, the lead-acid battery 12 and the lithium-ion battery 14. Each by-wire system is connected to both the lead-acid battery 12 side and the lithium-ion battery 14 side. Therefore, as the by-wire systems are able to receive a supply of power from both the lead-acid battery 12 and the lithium-ion battery 14, the vehicle operation can be reliably ensured using the power supply without a device such as a capacitor or the like for providing a backup power supply.

A plurality of accessories such as an air conditioner, audio equipment and the like that receive a supply of power for operation, as well as so-called by-wire systems, such as an accelerator, a brake and the like, are connected to the direct current generator 20, the lead-acid battery 12 and the lithium-ion battery 14. Each by-wire system is connected to both the lead-acid battery 12 side and the lithium-ion battery 14 side. Therefore, as the by-wire systems are able to receive a supply of power from both the lead-acid battery 12 and the lithium-ion battery 14, the vehicle operation can be reliably ensured using the power supply without the device such as a capacitor or the like for providing a backup power supply.

Furthermore, the accessory includes those provided on the lead-acid battery 12 side (such as the audio equipment, car navigation equipment, an ABS system, an oil pump and the like), and those provided on the lithium-ion battery 14 side (for example, meters, a defogger, wipers, a power window and the like). Each accessory and each by-wire system receive a supply of power from the direct current generator 20, the lead-acid battery 12 and the lithium-ion battery 14 when the vehicle is driven by the engine. On the other hand, when the engine is stopped, the supply of power is received from the lead-acid battery 12 or the lithium-ion battery 14. There are accessories such as the audio equipment, the car navigation equipment and the like, which are able to receive the supply of power when an ignition switch of the vehicle is in an accessory position or an ignition ON position, and accessories such as the oil pump, the ABS system, the air conditioner and the like, that are able to receive the supply of power when the ignition switch is in the ignition ON position.

The DC/DC converter 22 is connected to an electronic control unit (hereafter referred to as the "ECU") 24 that contains a micro computer. The ECU 24 operates the DC/DC converter 22 so that power supply and reception between the lead-acid battery 12 side and the lithium-ion battery 14 side is carried out appropriately. The change-over switch 16 is furthermore connected to the ECU 24. The change-over switch 16 has a function that selectively switches the battery connected to a starter 18 between the lead-acid battery 12 and the lithium-ion battery 14, according to a command from the ECU 24. The ECU 24, based on a condition that is explained later, determines the battery to be connected to the starter 18 and controls the change-over switch 16 so that the determined battery is selected.

An operating state detector 30 is also connected to the ECU 24. The operating state detector detects whether the engine is in a warmed-up state, whether a mileage or a vehicle speed after an engine start has reached a predetermined value, whether there is a braking operation by a vehicle operator, a shift position of a transmission, and, if the vehicle has an automatic transmission, whether a brake pedal effort has reached a predetermined value, and, if the vehicle has a manual transmission, whether there is an operation of a clutch pedal. The ECU 24 determines whether the vehicle is in a stopped state (a state where the speed is substantially "0") based on a result of the operating state detector 30. The ECU 24 further determines whether a condition for executing the control that transfers the engine from an operating state to a stopped state and further transfers the engine from the stopped state to the operating state (this control is hereafter referred to as the "idling stop control") has been established.

Hereafter, the power supply control system 10 according to this exemplary embodiment will be explained.

According to the exemplary embodiment, if the ignition switch is operated from the OFF position to the accessory position by the vehicle operator while the engine is stopped, the accessories that should operate in the accessory position enter the operational state upon receipt of the supply of power from the lead-acid battery 12. Furthermore, if the ignition switch is operated from the accessory position to the ignition ON position, the accessories that should operate in the ignition ON position enter the operational state upon receipt of the supply of power from the lead-acid battery 12.

Furthermore, if the ignition switch is operated from the ignition ON position to the starter ON position, the power supply from the lead-acid battery 12 to each accessory is stopped, and the starter 18 is connected to the lead-acid battery 12 through the change-over switch 16. The starter 18 receives the supply of power from the lead-acid battery 12 so as to enter the operational state. In this case, the starter 18 activates the engine so as to be started from the stopped state. Once the engine starts and enters the operating state, the operating state is continued even if the ignition switch transfers from the starter ON position to the ignition ON position.

When the engine is in the operating state, kinetic energy from regenerative braking of the vehicle is converted to electrical energy by the direct current generator 20. In this case, the lead-acid battery 12 is charged by a charging voltage from the direct current generator 20 and each accessory and the like enters the operational state. Furthermore, the lithium-ion battery 14 is charged by the voltage stepped up from the charging voltage of the direct current generator 20 by the operation of the DC/DC converter 22, and the other accessories and the like enter the operational state. If the lithium-ion battery has been fully charged at this point, the operation of the DC/DC converter 22 is prohibited to prevent overcharging of the lithium-ion battery, and the power supply from the lead-acid battery 12 side to the lithium-ion battery 14 side is stopped.

Furthermore, after the engine of the vehicle is started and enters the operating state, the operating state detector 30 is operative to determine whether the vehicle is in the stopped state, based on the presence of the brake operation and the brake pedal effort, the presence of the clutch operation and the shift position of the transmission. The operating state detector detects whether the condition for executing the idling stop control has been established, based on the stopped state of the vehicle, the warmed-up state of the vehicle, the mileage or history of vehicle speed after the engine start, and the like. If it is determined that the condition for executing the idling stop control has been established, fuel injection, ignition and so on are stopped without operation performed by the vehicle operator for transferring the ignition switch from the ignition ON position to the OFF position. Accordingly the engine is transferred from the operating state to the stopped state.

In the case where the engine has entered the stopped state under the idling stop control, the ignition switch is maintained in the ignition ON position. Therefore the accessories such as the air conditioner, a power steering device, the meters, and the by-wire systems such as the accelerator and the brakes maintain the operational state wherein the power supply is received from the lithium-ion battery 14. The accessories and the by-wire systems that require voltage holding, such as the audio and car navigation equipment, the ABS, and the oil pump maintain the operational state wherein the power supply is received from either the lead-acid battery 12 or the lithium-ion battery 14 through the DC/DC converter 22.

When the engine is in the stopped state under the idling stop control, it is determined whether a condition for canceling the idling stop control has been established using the operating state detector 30, based on whether the shift position of the transmission has been transferred from an "N" range to a "D" range or an "R" range assuming that the vehicle has an automatic transmission, or whether the brake operation has been released, or whether the clutch pedal has been pressed assuming that the vehicle has a manual transmission. As a result, in the case where it is determined that the condition for canceling the idling stop control has been established, the starter 18 enters the operational state, the engine starts and the operating state is restarted without requiring the vehicle operator to transfer the ignition switch from the ignition ON position to the starter ON position. Hereafter, the aforementioned engine start operation will be referred to as the "restart". Meanwhile the engine start operation in accordance with a normal procedure for operating the ignition switch starter into ON position will be referred to as the "normal start."

In this way, in the vehicle according to the exemplary embodiment, after the engine has entered the operating state, the idling stop control is executed while the vehicle is stopped. Therefore, according to this exemplary embodiment, maintaining the engine in the wasteful operating state may be avoided and because of this, the engine is operated in a highly efficient manner and an improvement in the fuel consumption is achieved.

In a system that executes the idling stop control, the frequency that the starter 18 enters the operational state, in other words, the frequency that power has to be supplied from a battery to the starter 18, is high because the start and stop of the engine is carried out more frequently than a system that does not execute the idling stop control. Under these conditions, if the comparatively high output density/ low energy density lead-acid battery 12 supplies power to the starter 18 on a constant basis, a state where the lead-acid battery 12 operates under a load continues, creating a situation whereby deterioration of the lead-acid battery 12 is precipitated.

The aforementioned problem may be solved by relatively increasing the capacity of the lead-acid battery 12. In the configuration of the embodiment, however, it is necessary to ensure a large mounting space for the lead-acid battery 12, and furthermore, it invites an increase in cost.

Because in general the engine is cold when the normal start takes place, the battery load is relatively large. On the other hand, because the engine is warmed-up when the restart takes place using the idling stop control, the battery load is relatively small. Therefore, in order to reliably ensure startability of the engine, it is appropriate to utilize a high output density battery that provides a high output per unit mass in a unit time. On the other hand, it is sufficient if a low output density battery is utilized instead of a high output density battery on the restart. The idling stop control is carried out at frequent intervals during vehicle running. Therefore, in order to reliably ensure the startability of the engine on the restart, it is appropriate to utilize a high energy density battery that provides a high energy per unit mass.

Therefore, according to this exemplary embodiment, on the engine start (the normal start) based on the intention of the vehicle operator, as expressed through an ignition operation, the starter 18 receives the supply of power from the lead-acid battery 12 and enters the operational state, as discussed above. On the engine start under the idling stop control (the restart), the starter 18 receives the supply of power from the lithium-ion battery 14, enters the operational state and starts the engine, based on the operation of the change-over switch 16 for switching the battery connected to the starter 18 to the lithium-ion battery 14 from the lead-acid battery 12.

According to this configuration, the startability of the engine can be reliably ensured even at low temperatures because the high output density lead-acid battery 12 is used on the normal start, and the startability of the engine can be reliably ensured without precipitating the deterioration of the lead-acid battery 12 even when the idling stop control is carried out frequently because the high energy density lithium-ion battery 14 is used on the restart. Therefore, according to this exemplary embodiment, even in the case of the engine start that accompanies an ignition operation by the vehicle operator, and in the case of the engine start that accompanies the idling stop control, the engine start can be carried out constantly in a reliable fashion without precipitating deterioration of the lead-acid battery 12.

FIG. 2 shows a flow chart of an example of a control routine, necessary to achieve the aforementioned functions, that is executed by the ECU 24 in the power supply control device 10 according to this exemplary embodiment. The routine shown by FIG. 2 is started up repeatedly at intervals with a predetermined time period. When the routine shown in FIG. 2 is started up, a process in Step 100 is executed first.

In step 100, the operating state detector 30 detects whether the restart of the engine has been requested, based on the establishment of the condition for canceling the idling stop control while the control is in operation. As a result, if it is determined that the restart of the engine has not been requested, the routine ends and does not proceed to any of the process that follows. On the other hand, if it is determined that the restart of the engine has been requested, the process proceeds to step 102.

In step 102, it is determined whether the battery capacity of the lithium-ion battery 14 has fallen to or below a predetermined level. If NO is obtained, that is, the battery capacity of the lithium-ion battery 14 has not fallen, it can be determined that the lithium-ion battery 14 can adequately operate the starter 18 and adequately transfer the engine to the operational state. The process then proceeds to step 104.

In step 104, the battery connected to the starter 18 is switched to the lithium-ion battery 14, and the change-over switch 16 is operated so that power is supplied from the lithium-ion battery 14 to the starter 18. In step 104, the starter 18 thereafter receives the supply of power from the lithium-ion battery 14, enters the operational state, and the engine restarts. When the process in step 104 is completed, the routine ends.

If YES is obtained in step 102, that is, the battery capacity of the lithium-ion battery 14 has fallen to or below the predetermined level, the starter 18 cannot operate even if power is supplied from the lithium-ion battery 14. Accordingly the engine may not be able to adequately transfer to the operational state. The process then proceeds to step 106.

In step 106, the battery connected to the starter 18 is switched to the lead-acid battery 12, and the change-over switch 16 is operated so that power is supplied from the lead-acid battery 12 to the starter 18. In step 106, the starter 18 thereafter receives the supply of power from the lead-acid battery 12, enters the operational state, and the engine restarts. When the process in step 106 is completed, the routine ends.

According to the routine shown in FIG. 2, on the restart of the engine that accompanies the idling stop control, power can be supplied to the starter 18 from the lithium-ion battery 14 and not the lead-acid battery 12 under the condition where the reduction in the battery capacity has not occurred. Therefore, according to the configuration of this exemplary embodiment, the starter 18 is operated by power supplied from the lead-acid battery 12 on the normal start that accompanies the ignition operation of the vehicle operator. Meanwhile the starter 18 is operated by power from the lithium-ion battery 14 on the restart that accompanies the idling stop control.

According to this configuration, on a cold start where the normal start takes place while the engine is cold, in other words even when the battery load is large, the startability of the engine can be reliably ensured because the comparatively high output density lead-acid battery 12 is utilized for operation of the starter 18. Furthermore, on the restart that accompanies the idling stop control, although the comparatively low output density lithium-ion battery 14 is utilized for operation of the starter 18, the startability of the engine can be reliably ensured because the restart that accompanies the idling stop control takes place while the engine is warmed-up (in other words, when the battery load is small.) Moreover, on the restart, because the comparatively high energy density lithium-ion battery 14 is utilized for operation of the starter 18, even if the engine restart is carried out frequently, deterioration of the lead-acid battery 12 is not precipitated and the startability of the engine can be reliably ensured.

According to the power supply control system 10 of this exemplary embodiment, in a vehicle where the engine is started frequently with the execution of the idling stop control, it is possible to reduce the frequency that the engine starts using the lead-acid battery 12. Furthermore, it is possible to switch the battery that supplies power to the starter 18 while considering the difference in battery loads for the normal start and the restart of the engine. Therefore, according to the power supply control system 10 of this exemplary embodiment, both the normal start and the restart of the engine can be reliably carried out without being accompanied by precipitation in deterioration of the lead-acid battery 12. Thus, it is possible to prevent malfunction of the system caused by breakdown or deterioration of one of the batteries.

In the system according to the exemplary embodiment whereby power is supplied to the starter 18 from the lithium-ion battery 14 on the engine restart that accompanies the idling start control, the battery voltage reduction of the lead-acid battery 12 may be avoided as the lead-acid battery 12 is not connected to the starter 18 on the engine restart. Therefore, the accessories such as the audio and car navigation equipment, the ABS, which has a hill-hold function, and the oil pump that are connected to the lead-acid battery 12 side reliably receive a power supply voltage and can maintain or continue operation even while the engine is being restarted utilizing the lithium-ion battery 14. In the event that the function of the lead-acid battery 12 becomes weakened because of the capacity reduction or the like when the engine restart occurs, the power supply voltage may be supplied to the accessories from the lithium-ion battery 14 through the DC/DC converter 22. Therefore, according to the system of this exemplary embodiment, a malfunction or a stop in operation (for example, interruption of audio sound, resetting of a navigation screen or the like) of the accessories that require voltage holding on the engine restart can be avoided and the operation of the accessory can be reliably ensured.

Meanwhile a voltage reduction may occur in the lithium-ion battery 14 connected to the starter 18 on the engine restart. However, the operation of the accessories such as the defogger and the wipers that are connected to the lithium-ion battery 14 side continues without being affected a great deal or without significant problems being generated, in spite of the reduction in the voltage supplied. Therefore, the system according to this exemplary embodiment is not susceptible to the influence resulting from the voltage reduction of the lithium-ion battery 14 on the engine restart.

Furthermore, in this exemplary embodiment, if the battery capacity of the lithium-ion battery 14 is reduced on the engine restart that accompanies the idling stop control, power is supplied to the starter 18 from the lead-acid battery 12, instead of the lithium ion battery 14. Therefore, on the engine restart, even if the engine start using the lithium-ion battery 14 cannot be performed owing to the reduction in the battery capacity of the lithium-ion battery 14, the engine can be started and operated reliably using the lead-acid battery 12. Therefore, according to the power supply control system 10 of this exemplary embodiment, it is possible to reliably avoid creating the situation whereby the engine restart is impossible due to the reduction in the battery capacity of the lithium-ion battery 14.

In the exemplary embodiment, the ECU 24 is operative to supply power from the lead-acid battery 12 to the starter 18 on the normal start, and to supply power from the lithium-ion battery 14 to the starter 18 on the restart by operating tthe change-over switch 16. Furthermore, the switching control of the battery is performed by executing step 102 and step 106 of the routine as shown in FIG. 2.

In the above exemplary embodiment, if the condition for executing the idling stop control is established, the engine is stopped, and if on the engine restart that accompanies the idling stop control, the battery capacity of the lithium-ion battery 14 is reduced, the engine is started utilizing the lead-acid battery 12. The execution of the idling stop control may be stopped if the battery capacities of the lead-acid battery 12 and the lithium-ion battery 14 are both reduced. The execution of the idling stop control may be stopped under the condition where at least one of the battery capacity and the battery voltage of the lead-acid battery and the lithium-ion battery 14 are reduced.

Furthermore, in the above exemplary embodiment, on the engine restart that accompanies the idling stop control, the engine is started utilizing the lead-acid battery 12 when the battery capacity of the lithium-ion battery 14 is reduced. However, in the event that the battery capacity of the lead-acid battery 12 has fallen to or below a predetermined value on the normal start that accompanies the ignition operation of the vehicle operator, the engine may be started utilizing the lithium-ion battery 14. In this configuration, even if the engine start utilizing the lead-acid battery 12 is impossible due to the battery capacity reduction thereof on the normal start of the engine, the situation whereby the engine cannot carry out the normal start due to the resultant battery capacity may be reliably avoided by utilizing the lithium-ion battery 14 for starting and operating the engine. In the exemplary embodiment, when it is determined that the battery capacity of the lead-acid battery 12 has been reduced, the ECU 24 is operative to execute battery switching control in which connection of the battery to the starter 18 is switched from the lead-acid battery 12 to the lithium-ion battery 14 such that power is supplied to the starter 18 from the lithium ion battery 14.

Furthermore, in the above exemplary embodiment, although determination is carried out, based on the battery capacity, as to whether the power supply from the lithium-ion battery 14 and the lead-acid battery 12 to the starter 18 can be adequately carried out, such determination is not limited to the battery capacity. The determination may be made utilizing parameters such as a temperature of the battery, the battery voltage or a battery current.

Furthermore, in the above exemplary embodiment, although the lithium-ion battery 14 is utilized as the comparatively low output density and high energy density battery, a nickel hydride battery or another lead-acid battery or the like may be used.

Moreover, in the above exemplary embodiment, if the ignition switch has been operated to the starter ON position by the vehicle operator, the starter 18 receives the supply of power from the lead-acid battery 12, enters the operational state and starts the engine. The above embodiment can also be applied to a configuration whereby the starter 18 receives the supply of power from the lead-acid battery 12, enters the operational state and starts the engine without being accompanied by the operation of the vehicle operator if an authentication is given based on a result of a wireless communication carried out between a portable unit carried by the vehicle operator and an on-vehicle unit on the vehicle side.

What is claimed is:

1. A power supply control system for a vehicle in which an idling stop control is performed such that an engine is automatically stopped and started in accordance with an operating state of the vehicle, the power supply control system comprising:
   a first battery connected to a starter of the vehicle;
   a second battery connected to the starter of the vehicle, and having an energy density higher than that of the first battery and having an output density lower than that of the first battery; and
   a controller operative to select the first battery to be connected to the starter so as to receive a power supply from the first battery under a first condition where the engine is started to cause the vehicle to take off, and to select the second battery to be connected to the starter so as to receive the power supply from the second battery under a second condition where the engine is started by the idling stop control.

2. The power supply control system according to claim 1, wherein the second battery comprises one of a lithium-ion battery and a nickel metal hydride battery.

3. The power supply control system according to claim 1, wherein the first battery comprises a lead-acid battery.

4. The power supply control system according to claim 2, wherein the first battery comprises a lead-acid battery.

5. The power supply control system according to claim 1, wherein the start of the engine under the first condition is established on the basis of an intention of a vehicle operator of causing the vehicle to take off.

6. The power supply control system according to claim 1, wherein the start of the engine under the first condition is established upon authentication of a wireless communication between a device mounted on the vehicle and a portable device carried by the vehicle operator.

7. The power supply control system according to claim 1, wherein the controller determines whether the power supply to the starter from the second battery is sufficient to start the engine; and when it is determined that the power supply to the starter from the second battery to start the engine under the second condition is insufficient, selects the first battery to be connected to the starter so as to receive the power supply from the first battery.

8. The power supply control system according to claim 1, wherein the controller determines whether the power supply to the starter from the first battery is sufficient to start the engine; and when it is determined that the power supply to the starter from the first battery to start the engine under the first condition is insufficient, selects the second battery to be connected to the starter so as to receive the power supply from the second battery.

9. The power supply control system according to claim 7, wherein the controller determines whether the power supply to the starter from the first battery is sufficient to start the engine; and when it is determined that the power supply to the starter from the first battery to start the engine under the first condition is insufficient, selects the second battery to be connected to the starter so as to receive the power supply from the second battery.

10. The power supply control system according to claim 9, wherein the controller determines each power supply sufficiency to the starter of the first battery and the second battery on the basis of one of parameters including a capacity, a temperature, a voltage, and a current of each of the first battery and the second battery.

11. The power supply control system according to claim 1, wherein the start of the engine under the second condition is canceled when at least one of a voltage and a capacity of each of the first battery and the second battery is smaller than a predetermined value.

12. A power supply control method for a vehicle in which an idling stop control is performed such that an engine is automatically stopped and started in accordance with an operating state of the vehicle, and a first battery and a second battery having a higher energy density and a lower output density than the first battery are connected to a starter, the power supply control method comprising:
    selecting the first battery to be connected to the starter so as to receive a power supply from the first battery under a first condition where the engine is started to cause the vehicle to take off; and
    selecting the second battery to be connected to the starter so as to receive the power supply from the second battery under a second condition where the engine is started by the idling stop control.

13. The power supply control method according to claim 12, wherein the start of the engine under the first condition is established on the basis of an intention of a vehicle operator of causing the vehicle to take off.

14. The power supply control method according to claim 12, wherein the start of the engine under the first condition is established upon authentication of a wireless communication between a device mounted on the vehicle and a portable device carried by the vehicle operator.

15. The power supply control method according to claim 12, further comprising determining whether the power supply to the starter from the second battery is sufficient to start the engine; and selecting the first battery to be connected to the starter so as to receive the power supply from the first battery when it is determined that the power supply to the starter from the second battery to start the engine under the second condition is insufficient.

16. The power supply control method according to claim 12, further comprising determining whether the power supply to the starter from the first battery is sufficient to start the engine; and selecting the second battery to be connected to the starter so as to receive the power supply from the second battery when it is determined that the power supply to the starter from the first battery to start the engine under the first condition is insufficient.

17. The power supply control method according to claim 15, further comprising determining whether the power supply to the starter from the first battery is sufficient to start the engine; and selecting the second battery to be connected to the starter so as to receive the power supply from the second battery when it is determined that the power supply to the starter from the first battery is insufficient.

18. The power supply control method according to claim 17, wherein each power supply sufficiency to the starter of the first battery and the second battery is determined on the basis of one of parameters including a capacity, a temperature, a voltage, and a current of the one of the first battery and the second battery.

19. The power supply control method according to claim 12, further comprising canceling the start of the engine under the second condition when at least one of a voltage and a capacity of each of the first battery and the second battery is smaller than a predetermined value.

* * * * *